United States Patent
Ohmori et al.

(10) Patent No.: US 12,422,254 B2
(45) Date of Patent: Sep. 23, 2025

(54) THICKNESS MEASUREMENT DEVICE AND THICKNESS MEASUREMENT METHOD

(71) Applicant: IHI Corporation, Tokyo (JP)

(72) Inventors: Seiichi Ohmori, Tokyo (JP); Masahiro Hato, Tokyo (JP); Tomohiko Shiota, Tokyo (JP)

(73) Assignee: IHI Corporation, Tokyo (JP)

( * ) Notice: Subject to any disclaimer, the term of this patent is extended or adjusted under 35 U.S.C. 154(b) by 351 days.

(21) Appl. No.: 18/313,533

(22) Filed: May 8, 2023

(65) Prior Publication Data

US 2023/0273017 A1 Aug. 31, 2023

Related U.S. Application Data

(63) Continuation of application No. PCT/JP2021/042236, filed on Nov. 17, 2021.

(30) Foreign Application Priority Data

Nov. 20, 2020 (JP) .................................. 2020-193499

(51) Int. Cl.
G01B 17/02 (2006.01)
(52) U.S. Cl.
CPC .................... G01B 17/02 (2013.01)
(58) Field of Classification Search
CPC .................. G01B 17/02; G01B 17/025; G01N 2291/02854
See application file for complete search history.

(56) References Cited

U.S. PATENT DOCUMENTS

| 5,038,615 A * | 8/1991 | Trulson ................. G01B 17/025 73/620 |
| 6,188,643 B1 * | 2/2001 | Liang ....................... G01V 1/48 367/30 |
| 2017/0092033 A1 * | 3/2017 | Stewart ................... G07D 7/205 |

(Continued)

FOREIGN PATENT DOCUMENTS

| CN | 105758346 A * | 7/2016 | ............ G01B 17/02 |
| CN | 110057328 A | 7/2019 | |

(Continued)

*Primary Examiner* — David L Singer
(74) *Attorney, Agent, or Firm* — Rothwell, Figg, Ernst & Manbeck, P.C.

(57) ABSTRACT

Provided is a thickness measurement device, including: an ultrasonic transmitter configured to transmit ultrasonic waves to a measurement object; an ultrasonic receiver configured to receive the ultrasonic waves reflected by the measurement object; a first extraction unit configured to extract a first reflected wave reflected by a first surface in the measurement object; a second extraction unit configured to extract a plurality of candidates for a second reflected wave reflected by a second surface in the measurement object; a matching degree calculation unit configured to calculate a matching degree between the first reflected wave and each of the plurality of candidates, for the each of the plurality of candidates; a candidate determination unit configured to determine, from the plurality of candidates, a candidate having the largest matching degree as the second reflected wave; and a thickness calculation unit configured to calculate a thickness of the measurement object.

4 Claims, 6 Drawing Sheets

(56) References Cited

U.S. PATENT DOCUMENTS

2021/0396719 A1* 12/2021 Harper .................. G01B 17/025
2022/0196398 A1*  6/2022 Goldammer ......... G01B 21/045

FOREIGN PATENT DOCUMENTS

| JP | H7-280542 A | | 10/1995 | |
|---|---|---|---|---|
| JP | 2840656 B2 | | 12/1998 | |
| JP | 2008-286610 A | | 11/2008 | |
| JP | 2022000615 A | * | 1/2022 | ............. G01B 17/02 |
| WO | 2020/070481 A1 | | 4/2020 | |

* cited by examiner

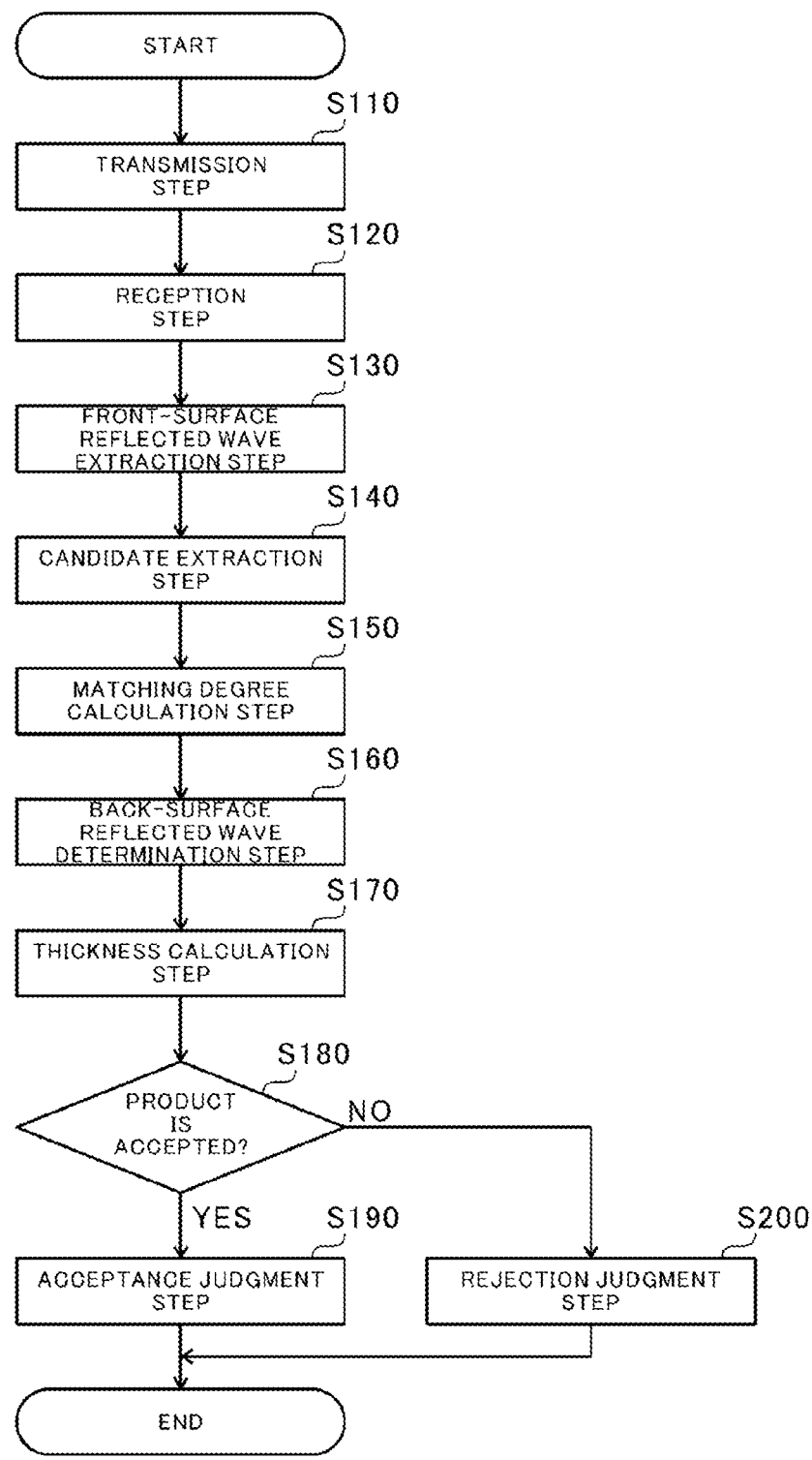

THICKNESS MEASUREMENT DEVICE AND THICKNESS MEASUREMENT METHOD

CROSS REFERENCE TO RELATED APPLICATIONS

This application is a continuation application of International Application No. PCT/JP2021/042236, filed on Nov. 17, 2021, which claims priority to Japanese Patent Application No. 2020-193499 filed on Nov. 20, 2020, the entire contents of which are incorporated by reference herein.

BACKGROUND ART

Technical Field

The present disclosure relates to a thickness measurement device and a thickness measurement method.

As a technology of measuring a thickness of a measurement object in a non-destructive manner, a technology using ultrasonic waves has been used. In such a technology, ultrasonic waves are transmitted to a front surface of the measurement object, and the thickness of the measurement object is measured based on a difference between a time at which a front-surface reflected wave reflected by the front surface is received and a time at which a back-surface reflected wave propagated inside of the measurement object and reflected by a back surface is received (for example, Patent Literature 1).

CITATION LIST

Patent Literature

Patent Literature 1: JP 2840656 B2

SUMMARY

Technical Problem

In the related art as described in Patent Literature 1 above, a wave which is received after the front-surface reflected wave is received, and has the largest amplitude is assumed as the back-surface reflected wave. However, for example, depending on the thickness of the measurement object, in some cases, an amplitude of a received wave which is not the back-surface reflected wave becomes larger than the amplitude of the back-surface reflected wave. Accordingly, in the related art, there has been a fear in that the received wave which is not the back-surface reflected wave is erroneously detected as the back-surface reflected wave. Thus, in the related art, there has been a problem in that measurement accuracy of the thickness is reduced.

The present disclosure has been made in view of the above-mentioned problem, and has an object to provide a thickness measurement device and a thickness measurement method with which a thickness of a measurement object can be highly accurately measured.

Solution to Problem

In order to solve the above-mentioned problem, according to one aspect of the present disclosure, there is provided a thickness measurement device, including: an ultrasonic transmitter configured to transmit ultrasonic waves to a measurement object; an ultrasonic receiver configured to receive the ultrasonic waves reflected by the measurement object; a first extraction unit configured to extract, from a received wave corresponding to the ultrasonic waves received by the ultrasonic receiver, a first reflected wave reflected by a first surface in the measurement object; a second extraction unit configured to extract, from the received wave, a plurality of candidates for a second reflected wave reflected by a second surface present on a back side of the first surface in the measurement object; a matching degree calculation unit configured to calculate a matching degree between the first reflected wave and each of the plurality of candidates, for the each of the plurality of candidates; a candidate determination unit configured to determine, from the plurality of candidates, a candidate having the largest matching degree as the second reflected wave; and a thickness calculation unit configured to calculate a thickness of the measurement object based on a reception time of the first reflected wave in the ultrasonic receiver and on a reception time of the second reflected wave determined by the candidate determination unit.

Further, the thickness measurement device may further include a range determination unit configured to determine, based on an estimated-thickness range of the measurement object, a range of a reception period estimated to include the second reflected wave, and the second extraction unit may be configured to extract the plurality of candidates from a received wave within the range.

Further, the matching degree calculation unit may be configured to compare a period in which the ultrasonic receiver receives the first reflected wave with a period in which the ultrasonic receiver receives a candidate for the second reflected wave so as to determine that a candidate having a period closer to the period in which the ultrasonic receiver receives the first reflected wave has a larger matching degree.

In order to solve the above-mentioned problem, according to one aspect of the present disclosure, there is provided a thickness measurement method, including the steps of: transmitting ultrasonic waves to a measurement object; receiving the ultrasonic waves reflected by the measurement object; extracting, from a received wave corresponding to the received ultrasonic waves, a first reflected wave reflected by a first surface in the measurement object; extracting, from the received wave, a plurality of candidates for a second reflected wave reflected by a second surface present on a back side of the first surface in the measurement object; calculating a matching degree between the first reflected wave and each of the plurality of candidates, for the each of the plurality of candidates; determining, from the plurality of candidates, a candidate having the largest matching degree as the second reflected wave; and calculating a thickness of the measurement object based on a reception time of the first reflected wave and on a reception time of the determined second reflected wave.

Effects

According to the present disclosure, the thickness of the measurement object can be highly accurately measured.

BRIEF DESCRIPTION OF DRAWINGS

FIG. 5 is a flow chart for illustrating a flow of a process of a thickness measurement method according to the embodiment.

DESCRIPTION OF EMBODIMENT

Figure 1:
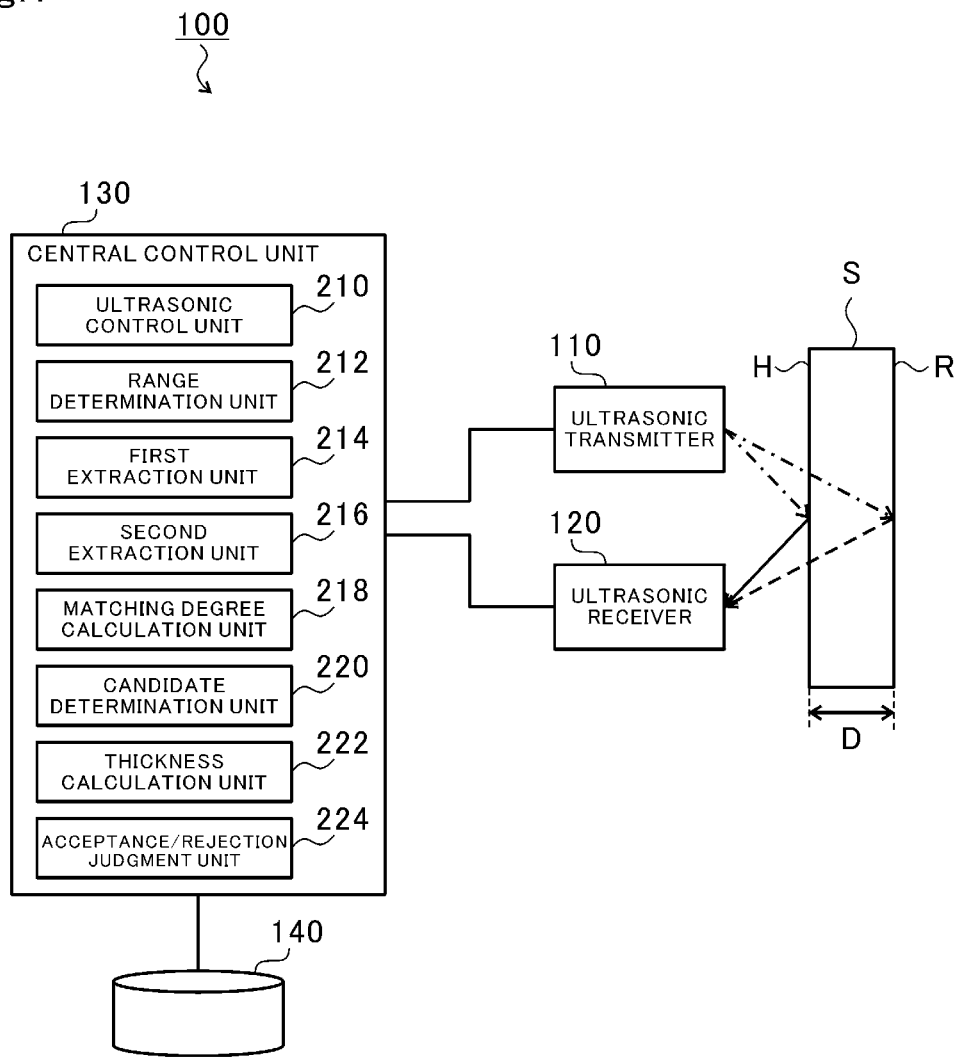
FIG. 1 is a diagram for illustrating a thickness measurement device according to an embodiment of the present disclosure.

Now, with reference to the attached drawings, an embodiment of the present disclosure is described in detail. The dimensions, materials, and other specific numerical values represented in the embodiment are merely examples used for facilitating the understanding of the disclosure, and do not limit the present disclosure otherwise particularly noted. Elements having substantially the same functions and configurations herein and in the drawings are denoted by the same reference symbols to omit redundant description thereof. Further, illustration of elements with no direct relationship to the present disclosure is omitted.

FIG. 1 is a diagram for illustrating a thickness measurement device 100 according to this embodiment. In FIG. 1, the dashed-dotted-line arrow indicates a transmitted ultrasonic wave. In FIG. 1, the solid-line arrow indicates a front-surface reflected wave. In FIG. 1, the broken-line arrow indicates a back-surface reflected wave.

The thickness measurement device 100 measures a thickness D of a measurement object S from a front surface H (first surface) side through use of ultrasonic waves. The measurement object S has a back surface R (second surface) being covered or the like, and thus the thickness D cannot be directly measured. The back surface R is a surface on the back side of the front surface H in the measurement object S.

As illustrated in FIG. 1, the thickness measurement device 100 measures the thickness D of the measurement object S based on a difference between a reception time of the front-surface reflected wave (first reflected wave) and a reception time of the back-surface reflected wave (second reflected wave). The front-surface reflected wave and the back-surface reflected wave are obtained by transmitting ultrasonic waves to the front surface H in the measurement object S. The front-surface reflected wave is an ultrasonic wave reflected by the front surface H of the measurement object S. The back-surface reflected wave is an ultrasonic wave propagated inside of the measurement object S and reflected by the back surface R.

In this embodiment, the thickness measurement device 100 inspects the measurement object S serving as a standardized article having substantially the same thickness D.

In this embodiment, the thickness measurement device 100 includes an ultrasonic transmitter 110, an ultrasonic receiver 120, a central control unit 130, and a memory 140.

The ultrasonic transmitter 110 is provided so as to be capable of transmitting ultrasonic waves to the measurement object S. The ultrasonic receiver 120 is provided so as to be capable of receiving the ultrasonic waves reflected by the measurement object S. In this embodiment, the ultrasonic receiver 120 receives at least the front-surface reflected wave and the back-surface reflected wave.

The central control unit 130 is formed of a semiconductor integrated circuit including a central processing unit (CPU). The central control unit 130 reads out, from a ROM, programs, parameters, and the like for use in operating the CPU. The central control unit 130 cooperates with a RAM serving as a work area or other electronic circuits so as to manage and control the entire thickness measurement device 100.

The memory 140 is formed of the ROM, the RAM, a flash memory, an HDD, and the like. The memory 140 stores programs and various types of data to be used in the central control unit 130. In this embodiment, the memory 140 stores an estimated thickness of the measurement object S, a tolerance of the measurement object S, a speed of sound of the measurement object S, and a threshold value to be described later. The estimated thickness of the measurement object S can be obtained by actually measuring the thickness in advance after cutting or the like of the measurement object S.

In this embodiment, the central control unit 130 functions as an ultrasonic control unit 210, a range determination unit 212, a first extraction unit 214, a second extraction unit 216, a matching degree calculation unit 218, a candidate determination unit 220, a thickness calculation unit 222, and an acceptance/rejection judgment unit 224.

The ultrasonic control unit 210 causes the ultrasonic transmitter 110 to transmit the ultrasonic waves. Further, for example, the ultrasonic control unit 210 converts the ultrasonic waves received by the ultrasonic receiver 120 into electrical signals (voltage values).

The range determination unit 212 determines, based on an estimated-thickness range stored in the above-mentioned memory 140, a range of a reception period (reception time period) estimated to include the back-surface reflected wave. In the following, the range of the reception period estimated to include the back-surface reflected wave is referred to as "gate range." The determination on the gate range performed by the range determination unit 212 is described in detail later.

The first extraction unit 214 extracts, from a received wave corresponding to the ultrasonic waves received by the ultrasonic receiver 120, the front-surface reflected wave reflected by the front surface H in the measurement object S.

Figure 2:
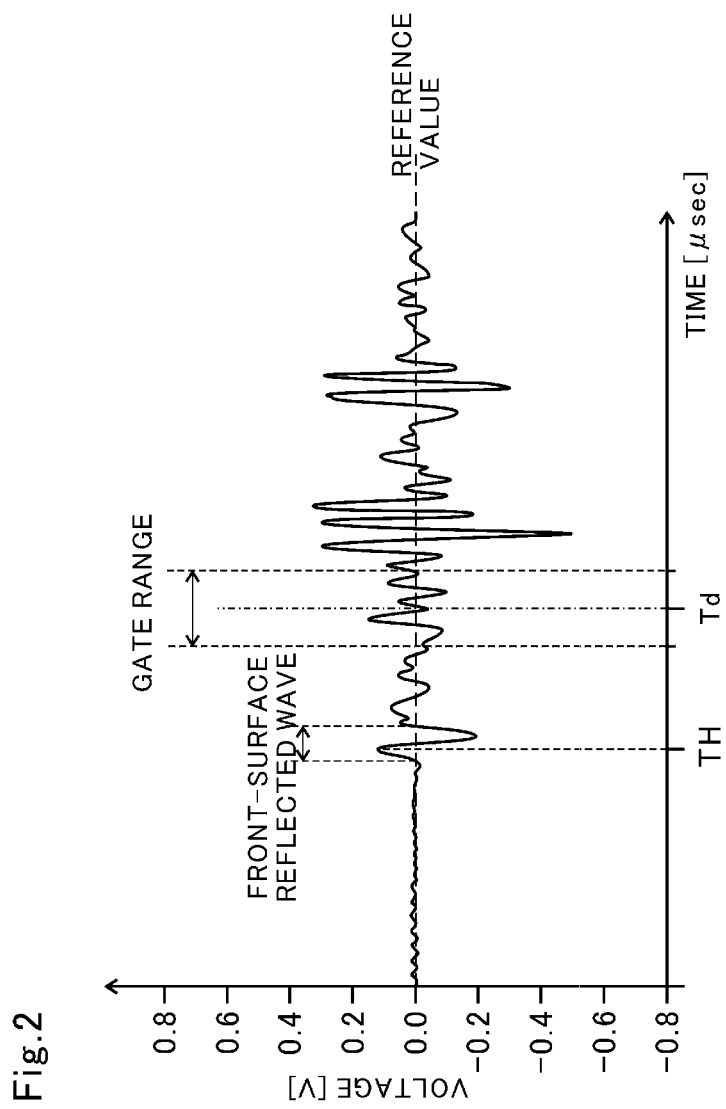
FIG. 2 is a chart for showing an example of a received wave.

FIG. 2 is a chart for showing an example of the received wave. In FIG. 2, the vertical axis represents a displacement amount (voltage [V]). Further, in FIG. 2, the horizontal axis represents a reception time period [μsec].

As shown in FIG. 2, the first extraction unit 214 extracts, from the received wave, a received wave which exceeds a predetermined displacement amount (absolute value), and has the fastest reception time of being received by the ultrasonic receiver 120 as the front-surface reflected wave.

As shown in FIG. 2, in this embodiment, in the front-surface reflected wave, the displacement amount is positively displaced from a reference value (for example, 0 V) so as to take the maximum value, is then negatively displaced so as to take the minimum value which is smaller than the reference value, and is positively displaced again so as to return to the reference value. Further, in the back-surface reflected wave, the displacement amount is negatively displaced from the reference value so as to take the minimum value, is then positively displaced so as to take the maximum value exceeding the reference value, and is then negatively displaced again so as to return to the reference value. That is, in this embodiment, the front-surface reflected wave and the back-surface reflected wave have inverted phases.

In some cases, the displacement amount of the front-surface reflected wave is negatively displaced from the reference value so as to take the minimum value, is then positively displaced so as to take the maximum value exceeding the reference value, and is negatively displaced again so as to return to the reference value. Similarly, in some cases, the displacement amount of the back-surface reflected wave is positively displaced from the reference value so as to take the maximum value, is then negatively displaced so as to take the minimum value which is smaller than the reference value, and is positively displaced again so as to return to the reference value. Accordingly, in one case, the displacement mode of the front-surface reflected wave is equal to the phase of the back-surface reflected wave, and the phases are inverted in another case.

The back-surface reflected wave arrives at the ultrasonic receiver 120 after the front-surface reflected wave arrives thereat. In view of the above, hitherto, a received wave which is received after the front-surface reflected wave is received, and has the largest amplitude (displacement amount) has been assumed as the back-surface reflected wave. However, for example, when the thickness D of the measurement object S is small, the amplitude of the received wave which is not the back-surface reflected wave may be larger than the amplitude of the back-surface reflected wave.

Figure 3A:
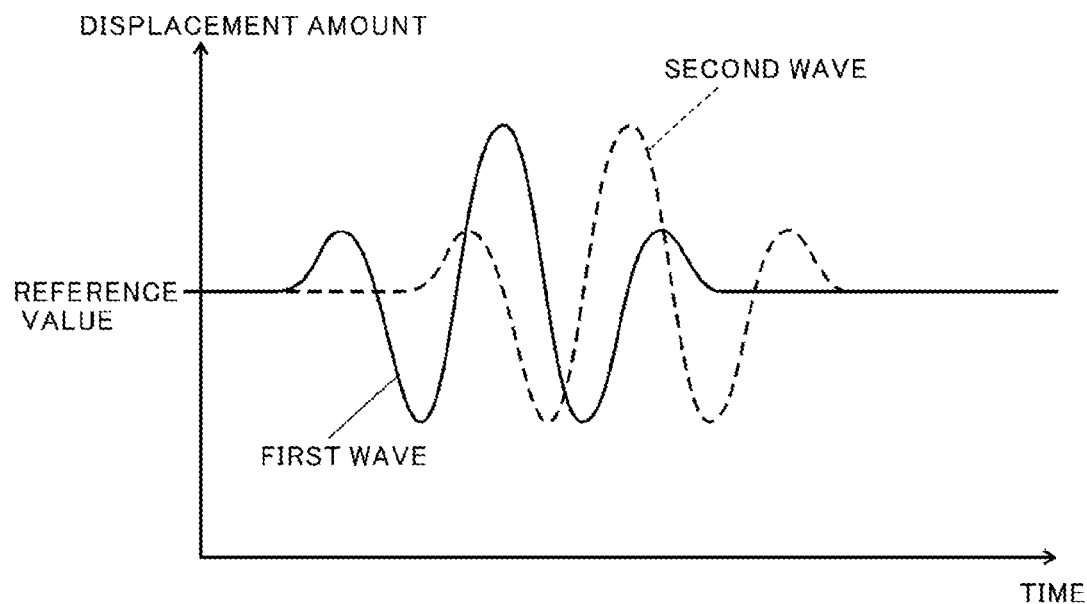
FIG. 3A is a chart for showing a plurality of ultrasonic waves.
Figure 3B:
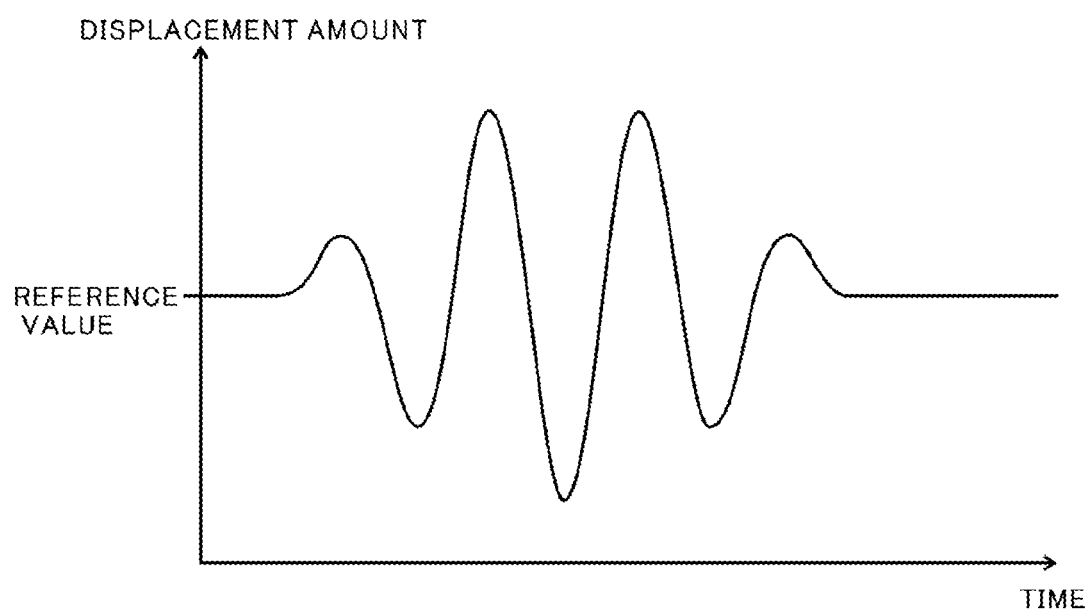
FIG. 3B is a chart for showing a waveform of a received wave in a case in which the ultrasonic waves shown in FIG. 3A are received in parallel to each other.

FIG. 3A is a chart for showing a plurality of ultrasonic waves. FIG. 3B is a chart for showing a waveform of a received wave in a case in which the ultrasonic waves shown in FIG. 3A are received in parallel to each other. In FIG. 3A, the solid line indicates a first wave, and the broken line indicates a second wave.

It is assumed that, as shown in FIG. 3A, the first wave and the second wave arrive at the ultrasonic receiver 120 in parallel to each other. In this case, as shown in FIG. 3B, a part of the first wave and a part of the second wave are combined with each other, and the amplitude of the combined wave becomes larger than the amplitude of the first wave or becomes larger than the amplitude of the second wave.

When the thickness D of the measurement object S is small (thin), a propagation time period of the ultrasonic wave in the measurement object S is short. Accordingly, a part of the front-surface reflected wave (rear hem in the received wave) and a part of the back-surface reflected wave (front hem in the received wave) simultaneously arrive at the ultrasonic receiver 120. In this case, those parts are combined with each other, and, in some cases, the ultrasonic receiver 120 detects a received wave having an amplitude larger than that of the back-surface reflected wave. Further, in some cases, a noise becomes larger than the amplitude of the back-surface reflected wave. Accordingly, in the related art, there has been a fear in that a received wave which is not the back-surface reflected wave is erroneously detected as the back-surface reflected wave. Thus, in the related art, there has been a problem in that the measurement accuracy of the thickness D is reduced.

In view of the above, the thickness measurement device 100 includes the second extraction unit 216, the matching degree calculation unit 218, and the candidate determination unit 220 so that the detection accuracy of the back-surface reflected wave is improved.

The second extraction unit 216 extracts, from the received wave received by the ultrasonic receiver 120, a plurality of candidates for the back-surface reflected wave reflected by the back surface R in the measurement object S. In this embodiment, the second extraction unit 216 extracts a plurality of candidates from the received wave within the gate range.

Referring back to FIG. 2, the range determination unit 212 calculates, based on the estimated thickness stored in the memory 140, a time (hereinafter referred to as "estimated arrival time") Td at which the back-surface reflected wave is estimated to arrive through use of the front-surface reflected wave as a start point. In addition, the range determination unit 212 determines, as the gate range, a predetermined period (for example, about several hundreds of nanoseconds) ranging around the estimated arrival time Td serving as a reference. The predetermined time period is determined based on the tolerance stored in the memory 140.

In addition, the second extraction unit 216 extracts a received wave within the determined gate range as the candidate for the back-surface reflected wave.

Figure 4A:
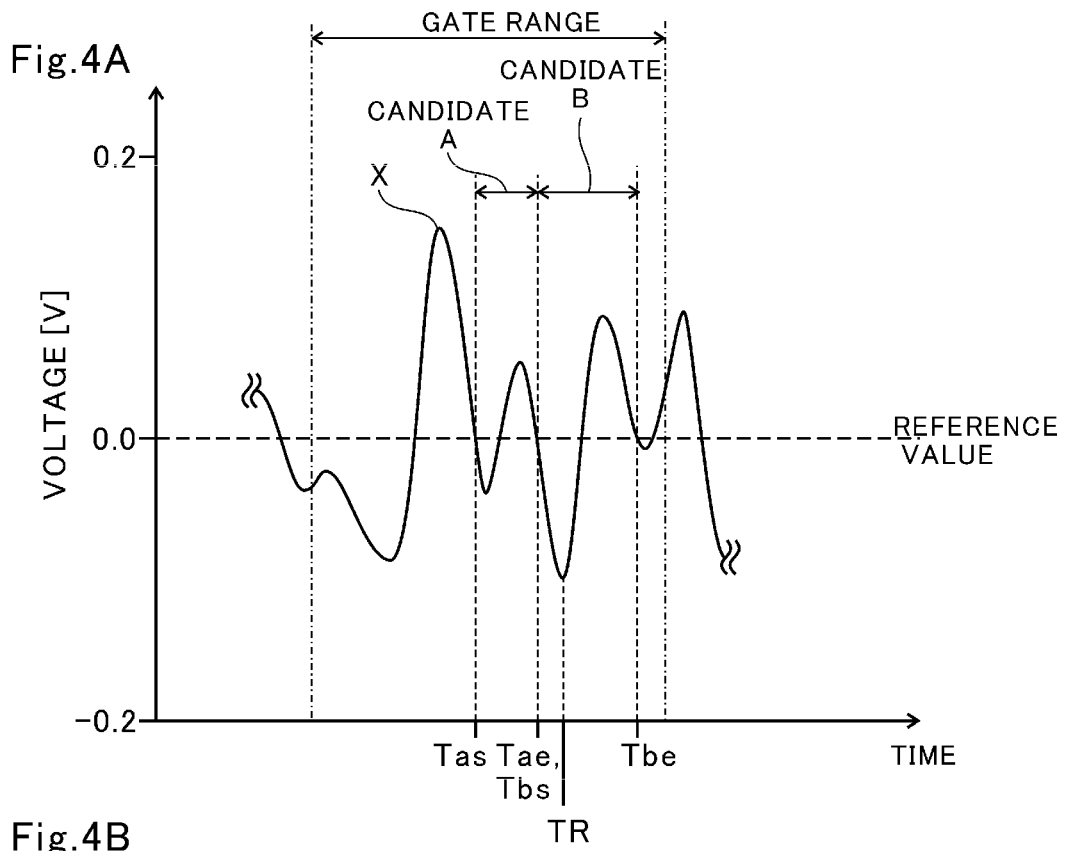
FIG. 4A is an enlarged chart of a gate range shown in FIG. 2.
Figure 4B:
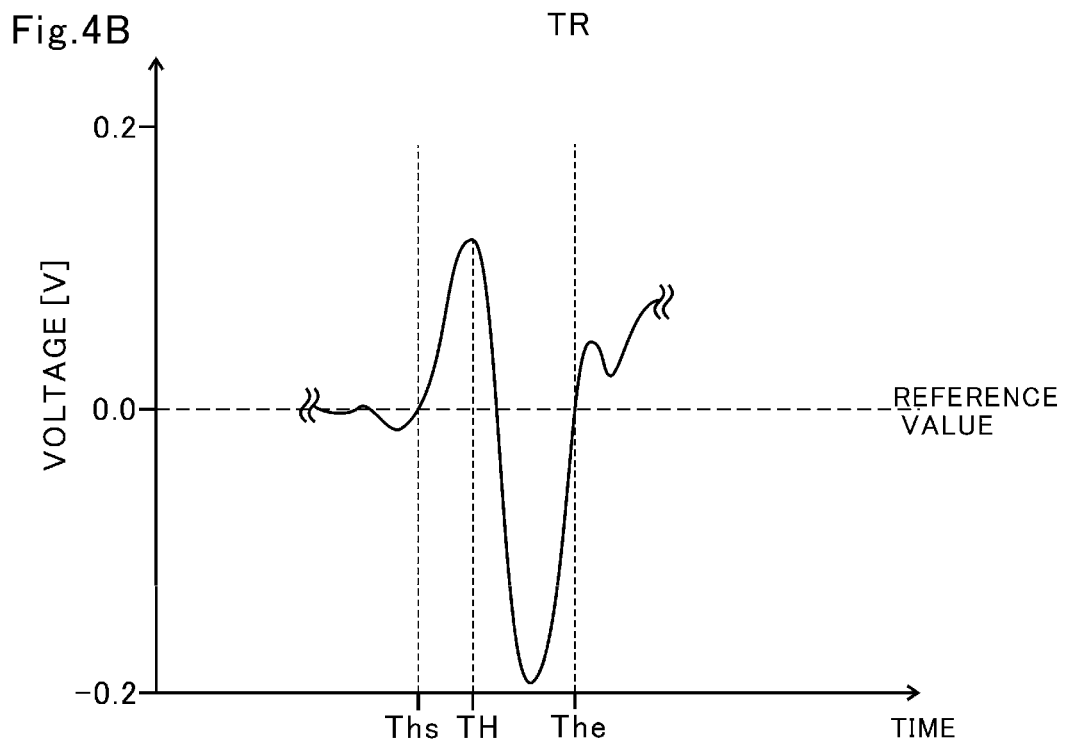
FIG. 4B is an enlarged chart of a front-surface reflected wave shown in FIG. 2.

FIG. 4A is an enlarged chart of the gate range shown in FIG. 2. FIG. 4B is an enlarged chart of the front-surface reflected wave shown in FIG. 2. As shown in FIG. 4A, in this embodiment, the second extraction unit 216 extracts a received wave whose start point of the received wave is the reference value (for example, 0 V) as the candidate for the back-surface reflected wave. Accordingly, the second extraction unit 216 extracts a candidate A and a candidate B as the candidates for the back-surface reflected wave, and does not extract a received wave X having no start point of the received wave.

The matching degree calculation unit 218 calculates, for each of the plurality of candidates A and B, a matching degree between the front-surface reflected wave and the candidate. In this embodiment, the matching degree calculation unit 218 compares a period in which the front-surface reflected wave is received with a period in which each of the candidate A and the candidate B is received so as to determine that a candidate having a period closer to the period in which the front-surface reflected wave is received has a larger matching degree.

As shown in FIG. 4B, the matching degree calculation unit 218 calculates a period (time period) from a reception time Ths corresponding to a start point of the front-surface reflected wave to a reception time The corresponding to an end point of the front-surface reflected wave. Further, as shown in FIG. 4A, the matching degree calculation unit 218 calculates a period from a reception time Tas corresponding to a start point of the candidate A to a reception time Tae corresponding to an end point of the candidate A. Similarly, the matching degree calculation unit 218 calculates a period from a reception time Tbs corresponding to a start point of the candidate B to a reception time Tbe corresponding to an end point of the candidate B.

In addition, the matching degree calculation unit 218 calculates a matching degree between a period in which the front-surface reflected wave is received (period from the time Ths to the time The) and a period in which the candidate A is received (period from the time Tas to the time Tae), and a matching degree between the period in which the front-surface reflected wave is received and a period in which the candidate B is received (period from the time Tbs to the time Tbe).

The candidate determination unit 220 determines, from the plurality of candidates A and B, a candidate having the largest matching degree as the back-surface reflected wave. In this embodiment, the matching degree calculation unit 218 determines the candidate B having a period closer to the period in which the front-surface reflected wave is received as the back-surface reflected wave.

The thickness calculation unit 222 calculates the thickness D of the measurement object S based on the reception time of the front-surface reflected wave in the ultrasonic receiver 120 and on the reception time of the back-surface reflected wave (candidate B) determined by the candidate determination unit 220.

$$D=(TH-TR)\times C/2 \qquad \text{Expression (1)}$$

In the above-mentioned expression (1), TH represents the reception time of the front-surface reflected wave, TR represents the reception time of the back-surface reflected wave, and C represents the speed of sound of the measurement object S.

In this embodiment, the reception time TH of the front-surface reflected wave is a time at which, in the front-surface reflected wave, the displacement amount first takes an extreme value (inflection point). Similarly, the reception time TR of the back-surface reflected wave is a time at which, in the back-surface reflected wave, the displacement amount first takes an extreme value.

As described above, in the front-surface reflected wave, the displacement amount is positively displaced from the reference value so as to take the maximum value, is then negatively displaced so as to take the minimum value which is smaller than the reference value, and is positively displaced again so as to return to the reference value. In the back-surface reflected wave, the displacement amount is negatively displaced from the reference value so as to take the minimum value, is then positively displaced so as to take the maximum value exceeding the reference value, and is negatively displaced again so as to return to the reference value.

Accordingly, the reception time TH of the front-surface reflected wave is a time at which the displacement amount takes the maximum value. Further, the reception time TR of the back-surface reflected wave is a time at which the displacement amount takes the minimum value.

The acceptance/rejection judgment unit 224 judges whether or not the calculated thickness D of the measurement object S is equal to or larger than a predetermined threshold value. The threshold value is a minimum thickness needed for the measurement object S. When the acceptance/rejection judgment unit 224 makes a judgment that the thickness D of the measurement object S is equal to or larger than the threshold value, it is judged that the measurement object S is an accepted product. On the other hand, when the acceptance/rejection judgment unit 224 makes a judgment that the thickness D of the measurement object S is smaller than the threshold value, it is judged that the measurement object S is a rejected product.

[Thickness Measurement Method]

Subsequently, description is given of a thickness measurement method of measuring the thickness D of the measurement object S through use of the above-mentioned thickness measurement device 100. FIG. 5 is a flow chart for illustrating a flow of a process of the thickness measurement method according to this embodiment. As illustrated in FIG. 5, the thickness measurement method according to this embodiment includes a transmission step S110, a reception step S120, a front-surface reflected wave extraction step S130, a candidate extraction step S140, a matching degree calculation step S150, a back-surface reflected wave determination step S160, a thickness calculation step S170, an acceptance/rejection judgment step S180, an acceptance judgment step S190, and a rejection judgment step S200. Now, each step is described.

[Transmission Step S110]

The transmission step S110 is a step of transmitting, by the ultrasonic transmitter 110, ultrasonic waves to the measurement object S based on a control command issued by the ultrasonic control unit 210.

[Reception Step S120]

The reception step S120 is a step of receiving, by the ultrasonic receiver 120, the ultrasonic waves reflected by the measurement object S.

[Front-Surface Reflected Wave Extraction Step S130]

The front-surface reflected wave extraction step S130 is a step of extracting, by the first extraction unit 214, from a received wave corresponding to the ultrasonic waves received in the reception step S120, a front-surface reflected wave reflected by the front surface H in the measurement object S.

[Candidate Extraction Step S140]

The candidate extraction step S140 is a step of extracting, by the second extraction unit 216, from the received wave received in the reception step S120, a plurality of candidates for a back-surface reflected wave reflected by the back surface R in the measurement object S. In this embodiment, the second extraction unit 216 extracts the candidates for the back-surface reflected wave from within the gate range determined by the range determination unit 212.

[Matching Degree Calculation Step S150]

The matching degree calculation step S150 is a step of calculating, by the matching degree calculation unit 218, the matching degree between the front-surface reflected wave extracted in the front-surface reflected wave extraction step S130 and the candidate extracted in the candidate extraction step S140, for each of the plurality of candidates.

[Back-Surface Reflected Wave Determination Step S160]

The back-surface reflected wave determination step S160 is a step of determining, by the candidate determination unit 220, from the plurality of candidates extracted in the candidate extraction step S140, the candidate having the largest matching degree as the back-surface reflected wave.

[Thickness Calculation Step S170]

The thickness calculation step S170 is a step of calculating, by the thickness calculation unit 222, the thickness D of the measurement object S based on the reception time TH of the front-surface reflected wave extracted in the front-surface reflected wave extraction step S130 and on the reception time TR of the back-surface reflected wave determined in the back-surface reflected wave determination step S160.

[Acceptance/Rejection Judgment Step S180]

The acceptance/rejection judgment step S180 is a step of making, by the acceptance/rejection judgment unit 224, an acceptance/rejection judgment of the measurement object S based on the thickness D of the measurement object S calculated in the thickness calculation step S170. In this embodiment, the acceptance/rejection judgment unit 224 judges whether or not the thickness D of the measurement object S calculated in the thickness calculation step S170 is equal to or larger than the threshold value. As a result, when the acceptance/rejection judgment unit 224 makes a judgment that the thickness D of the measurement object S is equal to or larger than the threshold value (YES in Step S180), the process proceeds to the acceptance judgment step S190. On the other hand, when the acceptance/rejection judgment unit 224 makes a judgment that the thickness D of the measurement object S is not equal to or larger than the threshold value, that is, makes a judgment that the thickness D of the measurement object S is smaller than the threshold value (NO in Step S180), the process proceeds to the rejection judgment step S200.

[Acceptance Judgment Step S190]

The acceptance judgment step S190 is a step of making, by the acceptance/rejection judgment unit 224, a judgment that the measurement object S is an accepted product.

[Rejection Judgment Step S200]

The rejection judgment step 200 is a step of making, by the acceptance/rejection judgment unit 224, a judgment that the measurement object S is a rejected product.

As described above, in the thickness measurement device 100 according to this embodiment and the thickness measurement method using this thickness measurement device 100, a plurality of candidates for the back-surface reflected wave are extracted, and the matching degree between each of the plurality of candidates and the front-surface reflected wave is calculated. In addition, the thickness measurement device 100 calculates the thickness D of the measurement object S assuming that the candidate having the largest matching degree is the back-surface reflected wave.

In the related art in which the received wave having the largest amplitude (displacement amount) is detected as the back-surface reflected wave, even in a case of a received wave having a small matching degree with respect to the front-surface reflected wave, when the received wave has the largest amplitude, the received wave is erroneously detected as the back-surface reflected wave. In contrast, the thickness measurement device 100 includes the matching degree calculation unit 218 and the candidate determination unit 220, and hence, regardless of the amplitude, a candidate having a large matching degree with respect to the front-surface reflected wave can be extracted as the back-surface reflected wave. Thus, the thickness measurement device 100 can reduce the possibility that the received wave which is not the back-surface reflected wave is erroneously detected as the back-surface reflected wave. Accordingly, the thickness measurement device 100 can accurately detect the back-surface reflected wave. Thus, the thickness measurement device 100 can highly accurately measure the thickness D of the measurement object S.

Further, as described above, the thickness measurement device 100 includes the range determination unit 212. As a result, the thickness measurement device 100 can further suppress erroneous detection of the back-surface reflected wave. Further, the thickness measurement device 100 can reduce the number of candidates as compared to the case in which the candidate for the back-surface reflected wave is extracted from the entire received wave. In this manner, the thickness measurement device 100 can reduce the processing load of the second extraction unit 216.

Further, as described above, the matching degree calculation unit 218 compares the period in which the front-surface reflected wave is received with the period in which each of the candidate A and the candidate B is received, and determines that a candidate having a period closer to the period in which the front-surface reflected wave is received has a larger matching degree. In this manner, the thickness measurement device 100 can highly accurately detect the back-surface reflected wave.

The embodiment has been described above with reference to the attached drawings, but, needless to say, the present disclosure is not limited to the above-mentioned embodiment. It is apparent that those skilled in the art may arrive at various alteration and modification examples within the scope defined by claims, and those examples are construed as naturally falling within the technical scope of the present disclosure.

For example, in the above-mentioned embodiment, the case in which the matching degree calculation unit 218 calculates the matching degree between the period in which the front-surface reflected wave is received and the period in which the candidate is received is given as an example. However, the matching degree calculation unit 218 may calculate the matching degree between the front-surface reflected wave and the candidate through use of other methods.

Figure 6A:
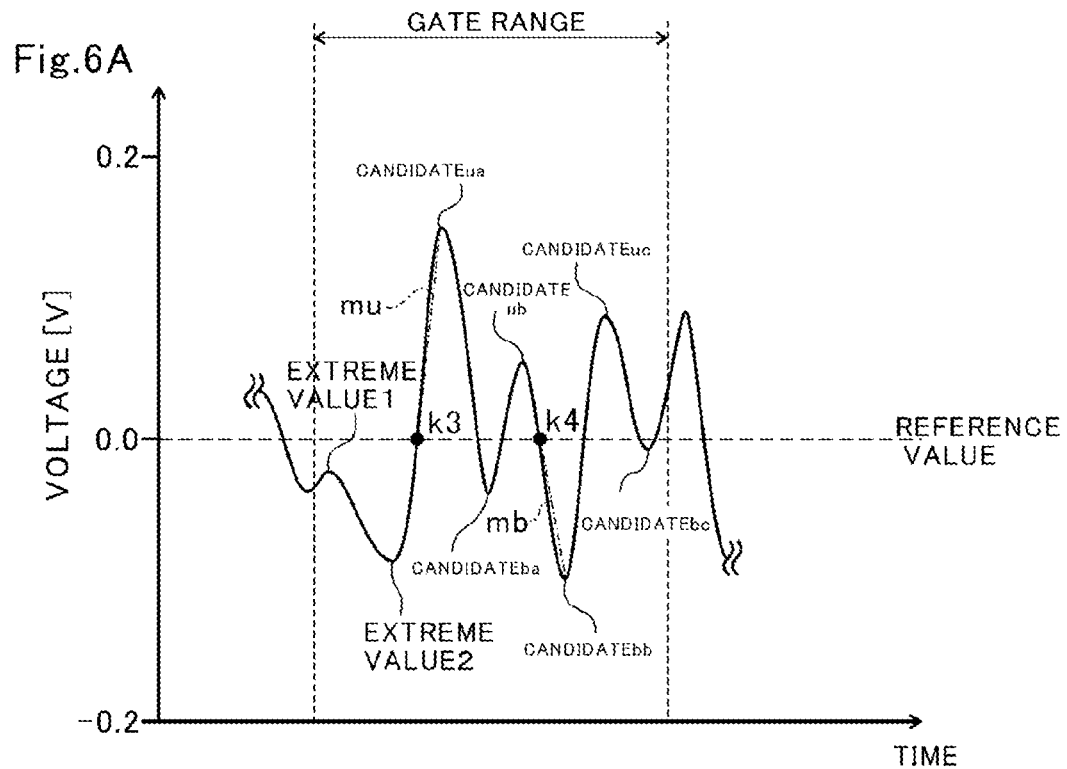
FIG. 6A is a chart for showing a received wave within the gate range.
Figure 6B:
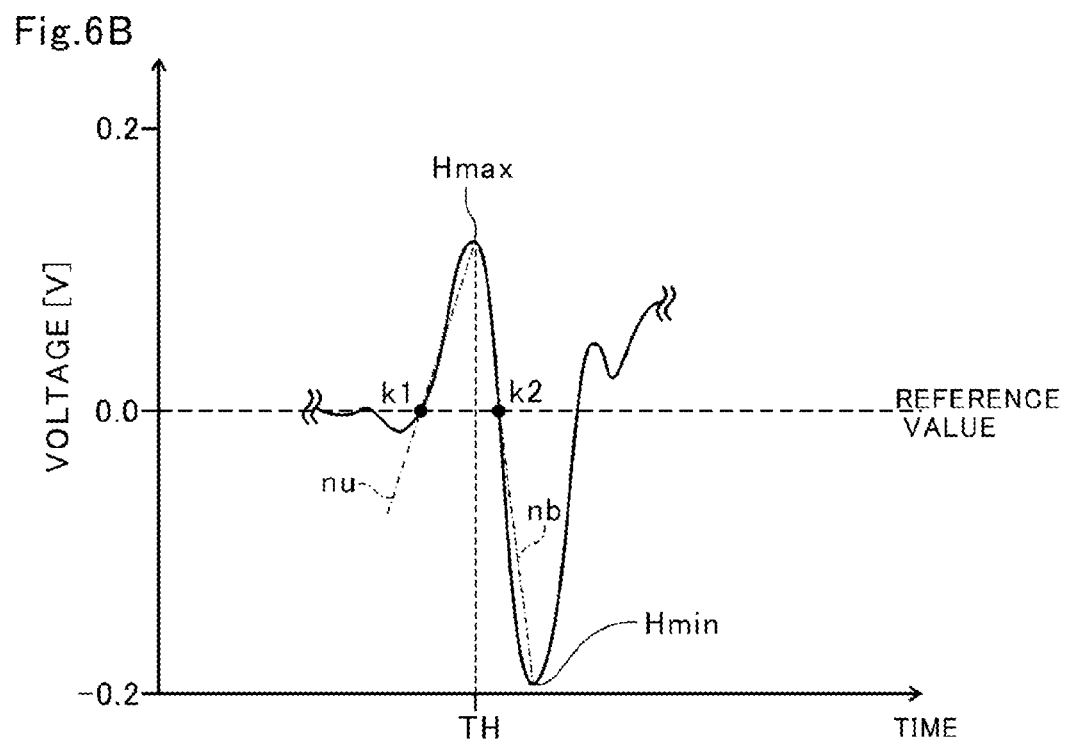
FIG. 6B is a chart for showing a front-surface reflected wave.

FIG. 6A is a chart for showing a received wave within the gate range. FIG. 6B is a chart for showing the front-surface reflected wave.

In a modification example, the second extraction unit 216 extracts, as shown in FIG. 6A, an extreme value within the gate range as the candidate. However, in the modification example, similarly to the above-mentioned embodiment, the second extraction unit 216 does not extract a received wave whose start point of the received wave does not take the reference value as the candidate for the back-surface reflected wave. That is, in the modification example, the second extraction unit 216 does not extract, as candidates, an extreme value 1 and an extreme value 2 in each of which the displacement amount does not take the reference value between the extreme value 1 or 2 and an extreme value immediately before the corresponding extreme value. Thus, the second extraction unit 216 extracts a candidate "ua," a candidate "ub," and a candidate "uc," which each have a positive extreme value, and a candidate "ba," a candidate "bb," and a candidate "bc," which each have a negative extreme value.

In addition, the matching degree calculation unit 218 calculates a matching degree between an absolute value of a slope of an imaginary connection line "nu" (indicated by the dashed-dotted line in FIG. 6B) connecting between an extreme value Hmax of the front-surface reflected wave and a reference value k1 immediately before the extreme value Hmax and an absolute value of a slope of an imaginary connection line connecting between each of the candidate "ba," the candidate "bb," and the candidate "bc" and a reference value immediately before the corresponding candidate. For example, as shown in FIG. 6B, the matching degree calculation unit 218 calculates a matching degree between an absolute value of a slope of an imaginary connection line "mb" (indicated by the dashed-dotted line in FIG. 6A) connecting between the candidate "bb" and a reference value k4 immediately before the candidate "bb" and the absolute value of the slope of the imaginary connection line "nu" of the front-surface reflected wave.

Further, the matching degree calculation unit 218 calculates a matching degree between an absolute value of a slope of an imaginary connection line "nb" (indicated by the dashed-dotted line in FIG. 6B) connecting between an extreme value Hmin of the front-surface reflected wave and a reference value k2 immediately before the extreme value Hmin and an absolute value of a slope of an imaginary connection line connecting between each of the candidate "ua," the candidate "ub," and the candidate "uc" and a reference value immediately before the corresponding candidate. For example, as shown in FIG. 6B, the matching degree calculation unit 218 calculates a matching degree between an absolute value of a slope of an imaginary connection line "mu" (indicated by the dashed-dotted line in FIG. 6A) connecting between the candidate "ua" and a reference value k3 immediately before the candidate "ua" and the absolute value of the slope of the imaginary connection line "nb" of the front-surface reflected wave.

In addition, the matching degree calculation unit 218 determines a candidate that is largest in any one or both of the matching degree with respect to the absolute value of the slope of the imaginary connection line "nu" and the matching degree with respect to the absolute value of the slope of the imaginary connection line "nb" as the back-surface reflected wave. Thus, even in the matching degree calculation unit 218 in the modification example, the back-surface reflected wave can be highly accurately detected.

Further, the matching degree calculation unit 218 in the modification example calculates the slope of the imaginary connection line connecting between the extreme value and the reference value immediately before the extreme value. When the matching degree calculation unit 218 calculates the slope of the imaginary connection line connecting between the extreme value and the reference value immediately after the extreme value, in a case in which the hem of the rear of the candidate overlaps the received wave received immediately after, there is a fear in that the end point of the candidate does not take the reference value. In this case, there may occur a situation in which the second extraction unit 216 cannot extract the extreme value of the back-surface reflected wave as the candidate. In contrast, the matching degree calculation unit 218 in the modification example calculates the slope of the imaginary connection line with respect to the reference value immediately before the extreme value, and hence the possibility that the extreme value of the back-surface reflected wave is not extracted as the candidate can be reduced.

Further, unlike the above-mentioned embodiment or the modification example, the matching degree calculation unit 218 may calculate a matching degree between a reception period between extreme values of the front-surface reflected wave (period from the extreme value Hmax to the extreme value Hmin) and a reception period between extreme values of the candidate (period from the minimum value to the maximum value).

Further, in the above-mentioned embodiment, the configuration in which the thickness measurement device 100 includes the range determination unit 212 is given as an example. However, the range determination unit 212 is not a necessary configuration.

Further, in the above-mentioned embodiment, the case in which the acceptance/rejection judgment unit 224 judges whether or not the thickness D of the measurement object S calculated by the thickness calculation unit 222 is equal to or larger than the threshold value is given as an example. However, the acceptance/rejection judgment unit 224 may judge whether or not the thickness D of the measurement object S calculated by the thickness calculation unit 222 falls within a predetermined threshold value range. In this case, when the thickness D falls within the threshold value range, the acceptance/rejection judgment unit 224 makes a judgment of acceptance, and when the thickness D is outside of the threshold value range, the acceptance/rejection judgment unit 224 makes a judgment of rejection.

Further, in the above-mentioned embodiment, the case in which the first extraction unit 214 extracts the front-surface reflected wave as the first reflected wave, and the second extraction unit 216 extracts a plurality of candidates for the back-surface reflected wave as the candidate for the second reflected wave is given as an example. However, the first extraction unit 214 may extract the back-surface reflected wave as the first reflected wave, and the second extraction unit 216 may extract a plurality of candidates for the front-surface reflected wave as the candidate for the second reflected wave. In this case, the matching degree calculation unit 218 calculates the matching degree between the back-surface reflected wave and the candidate for the front-surface reflected wave, for each of the plurality of candidates.

What is claimed is:

1. A thickness measurement device, comprising:
   an ultrasonic transmitter configured to transmit ultrasonic waves to a measurement object;
   an ultrasonic receiver configured to receive the ultrasonic waves reflected by the measurement object;
   a first extraction unit configured to extract, from a received wave corresponding to the ultrasonic waves received by the ultrasonic receiver, a first reflected wave reflected by a first surface in the measurement object;
   a second extraction unit configured to extract, from the received wave, a plurality of candidates for a second reflected wave reflected by a second surface present on a back side of the first surface in the measurement object;
   a matching degree calculation unit configured to calculate a matching degree between the first reflected wave and each of the plurality of candidates, for the each of the plurality of candidates;
   a candidate determination unit configured to determine, from the plurality of candidates, a candidate having the largest matching degree as the second reflected wave; and
   a thickness calculation unit configured to calculate a thickness of the measurement object based on a reception time of the first reflected wave in the ultrasonic receiver and on a reception time of the second reflected wave determined by the candidate determination unit.

2. The thickness measurement device according to claim 1, further comprising a range determination unit configured to determine, based on an estimated-thickness range of the measurement object, a range of a reception period estimated to include the second reflected wave,
   wherein the second extraction unit is configured to extract the plurality of candidates from a received wave within the range.

3. The thickness measurement device according to claim 1, wherein the matching degree calculation unit is configured to compare a period in which the ultrasonic receiver receives the first reflected wave with a period in which the ultrasonic receiver receives a candidate for the second reflected wave so as to determine that a candidate having a period closer to the period in which the ultrasonic receiver receives the first reflected wave has a larger matching degree.

4. A thickness measurement method, comprising the steps of:
   transmitting ultrasonic waves to a measurement object;
   receiving the ultrasonic waves reflected by the measurement object;
   extracting, from a received wave corresponding to the received ultrasonic waves, a first reflected wave reflected by a first surface in the measurement object;
   extracting, from the received wave, a plurality of candidates for a second reflected wave reflected by a second surface present on a back side of the first surface in the measurement object;
   calculating a matching degree between the first reflected wave and each of the plurality of candidates, for the each of the plurality of candidates;
   determining, from the plurality of candidates, a candidate having the largest matching degree as the second reflected wave; and calculating a thickness of the measurement object based on a reception time of the first reflected wave and on a reception time of the determined second reflected wave.

* * * * *